United States Patent [19]
Jacobs et al.

[11] Patent Number: 5,251,129
[45] Date of Patent: Oct. 5, 1993

[54] METHOD FOR AUTOMATED MORPHOLOGICAL ANALYSIS OF WORD STRUCTURE

[75] Inventors: Paul S. Jacobs, Clifton Park; George R. Krupka, Schenectady, both of N.Y.

[73] Assignee: General Electric Company, Schenectady, N.Y.

[21] Appl. No.: 570,583

[22] Filed: Aug. 21, 1990

[51] Int. Cl.$^5$ .............................................. G06F 15/20
[52] U.S. Cl. .............................................. 364/419.08
[58] Field of Search .......................................... 364/419

[56] References Cited

U.S. PATENT DOCUMENTS

| | | | |
|---|---|---|---|
| 4,342,085 | 7/1982 | Glickman et al. | 364/419 |
| 4,724,523 | 2/1988 | Kucera | 364/419 |
| 4,775,956 | 10/1988 | Kaji et al. | 364/419 |
| 4,852,003 | 7/1989 | Zamora | 364/419 |
| 4,864,501 | 9/1989 | Kucera et al. | 364/419 |
| 4,887,212 | 12/1989 | Zamora et al. | 364/419 |

*Primary Examiner*—Robert A. Weinhardt
*Attorney, Agent, or Firm*—Paul R. Webb, II

[57] ABSTRACT

A morphological analysis method is described. In one aspect of the invention, the method includes the steps of breaking a word into potential base-affix pairs, modifying the base of each base-affix pair into possible roots, accessing each lexical entry of each root in a lexicon, deriving a lexical entry for a root if the lexical entry is not provided in the lexicon, retrieving the derivation information for each affix from the entry, applying the derivation information to the entry, and returning all derived entries.

10 Claims, 3 Drawing Sheets

METHOD FOR AUTOMATED MORPHOLOGICAL ANALYSIS OF WORD STRUCTURE

A portion of this disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The present invention relates generally to natural language processing, and more particularly, relates to a system for automated morphological analysis of word structure.

RELATED APPLICATIONS

The present application is related to commonly assigned and copending U.S. patent application Ser. Nos. 07/570,585 and 07/570,584 entitled, respectively, A Method For Generating A Lexicon and Sense Discrimination System And Method.

BACKGROUND OF THE INVENTION

Automated natural language (NL) text processing typically refers to text processing, such as text retrieval performed on text by a computer capable of "reading" and "understanding" the semantics of the text. Efficient natural language processing systems can be of great benefit in performing tasks such as information retrieval. The computer, by being able to understand the meaning, i.e., semantics, of the text, can perform a more accurate search and bring only relevant information to the attention of the requestor.

In order to perform such "intelligent" searches, the computer itself must "understand" the text. Natural language processing systems therefore typically contain tools, or software modules, to facilitate generating a representation of an understanding of the text. Particularly, when text is input to a NL system, the system not only stores the text but also generates a representation, in a computer-understandable format, of the meaning, i.e., semantics, of the text.

For generating a computer-understandable semantic representation of text, natural language processing systems include, in general and at a high level, a lexicon module and a processing module. The lexicon module is a "dictionary", or database, containing words and semantic knowledge related to each word. The processing module typically includes a plurality of analyzer modules which operate upon the input text and the lexicon module in order to process the text and generate the computer-understandable semantic representation. Particularly, the processing module generates a recorded version for each word of text, and the recoded version includes fields which represent semantic knowledge. Once this semantic knowledge of the text is generated in a computer-understandable format, a system user can use the computer, via an application program such as a search program to perform tasks such as text retrieval.

One analyzer module which may be utilized to operate upon input text to facilitate generation of the computer-understandable semantic representation of the text is a morphological analysis module. Morphologic analysis, as used herein, refers to the derivation of lexical entries for a word based on its internal structure. The internal structure of a word refers to lexical constituents, i.e., root and any affixes, that make up the word.

Known morphological analysis systems utilize affix stripping methods to obtain a word root. The affixes of the word are discarded. The lexical entry is created from the word root alone. Utilizing only the word root, however, limits the accuracy of these known morphological analysis systems. For example, for two separate words having a common root, identical lexical entries will be generated. The two words, in their entirety, however, may have totally different meanings. Until now, no known morphological analysis system utilizes affix information to generate more accurate lexical entries which contain more semantic knowledge.

SUMMARY OF THE INVENTION

The present morphological analysis system generates a recorded version for each word of text by breaking a word into potential base-suffix pairs and base-prefix pairs. Then, using spelling rules, possible roots of each base are determined. For each possible root, a word version is obtained from a lexicon module. If the lexicon module does not have an entry for a particular root, the entry can be derived. For each word, derivation information for each affix is derived. The derivation information is then represented in the lexical entry. For each pair, optimization operations are employed to determine the likelihood of the accuracy of each base-suffix and each base-prefix pair.

Importantly, the present invention provides explicit recognition in text representation of the relationship between words that derive from a common root by utilizing the word root along with information contained in the complete form in which a word appears, i.e., prefix, affix and root.

BRIEF DESCRIPTION OF THE DRAWINGS

These and other objects of the present invention, together with further features and advantages thereof, will become apparent from the following detailed specification when read together with the accompanying drawings, in which.

DETAILED DESCRIPTION OF THE DRAWINGS

The present invention is specifically directed to a morphological analysis system and method. It is contemplated that the present invention could be utilized in a larger automated natural language text processing system which includes other modules which provide other types of semantic knowledge. Further, although the present invention is described with reference to a particular lexicon, it is contemplated that the present invention could be used with many other lexicons and is not limited to practice with any one particular lexicon.

Figure 1:
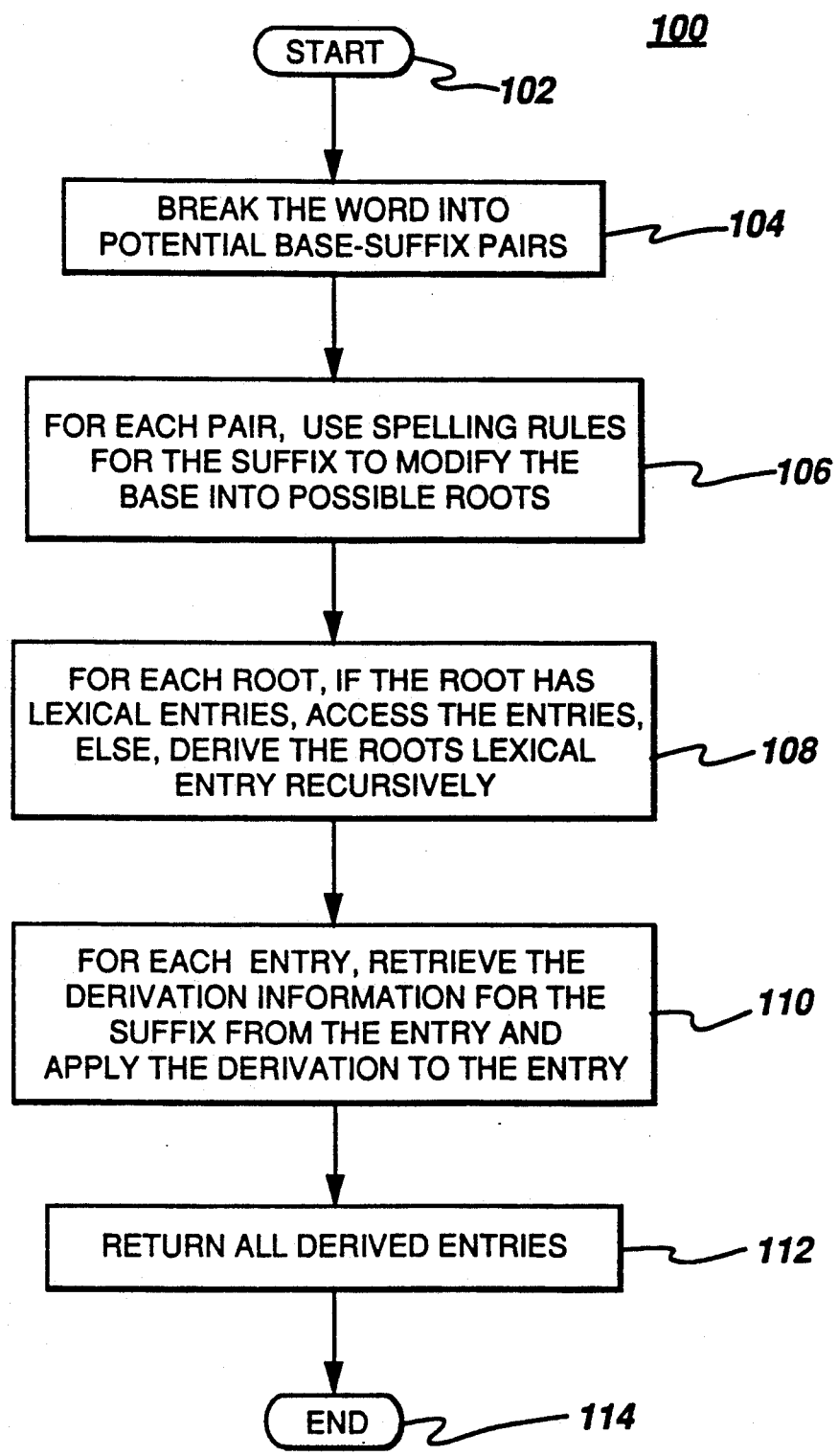
FIG. 1 is a flowchart illustrating a sequence of method steps for performing morphological analysis in accordance with the present invention.

Referring now to FIG. 1, a flowchart 100 illustrating a sequence of method steps for performing morphological analysis in accordance with the present invention is shown. Although the steps shown indicate that the analysis is for suffixes, the same operations are to be performed for prefixes. Subsequent to starting operations as indicated at 102, the word under analysis is broken into potential base and suffix pairs as indicated at 104. This involves stripping off the suffixes which could end the word, including no suffix at all. For example, the word "quickly" would generate three pairs: (quickly-null), (quickly-y), and (quick-ly). The -null suffix represents no suffix, which would mean that "quickly" is a root. At this point, no determination has been made on the validity of these breakdowns.

For each pair, the next step, as indicated at 106, is to determine what the true root is, since the base may include a spelling change. For example, the base "hitt" for the suffix -ing is the result of "doubling" the final consonant "t" of the root "hit". For the analysis, the entry "t" must be removed. The spelling rules of English are somewhat arbitrary, with many exceptions. Thus, each base may produce several possible roots.

As indicated at 108, for each root, its lexical entries must accessed. In the case of the word "book", this task is simply a look-up operation. However, the root itself could be a derivative of some other word, and thus the analyzer must recursively derive the entries for this root. For example, the word "acquisitions" has an immediate root "acquisition", which is a derivative of the word "acquire". Note that in either case, a root may have multiple lexical entries representing different parts of speech.

As indicated at 110, for each of these entries, the derivative entry for the suffix must be retrieved. The derivative entry specifies the derived part of speech or lexical subcategory and the semantic transformation rules to apply to the entry's senses. Using the derivative entry, the morphological analyzer creates a virtual lexical entry for the original word.

The process is complicated by three sources of ambiguity: word to base, base to root, and root to entry. The word may have several possible breakdowns, the base may have several possible roots, and the root may have several entries. To try all possible paths in this morphological analysis may, in some cases, be inefficient.

In order to optimize the process, lexical targets may be used. A lexical target is a desired part of speech to be derived at a certain stage of analysis. The targets are determined depending on the current suffix it is processing. For example, the suffix -s can only transform a verb into the third person singular present form or a noun into the plural form. Thus, the only possible parts of speech for a root entry of a word ending in the -s suffix are noun and verb. Noun and verb are thus the lexical targets for -s. The analyzer system "knows" this about -s, and therefore will not access (or derive) root entries which are not nouns or verbs. For example, the analyzer would not consider the preposition lexical entry for root "down" if it was analyzing the word "downs".

Another optimization involves a look-ahead search strategy which tries to prune derivations which have little hope of succeeding. This strategy is a heuristic based on the fact that it is rare that a word will have two derivations based on different roots, (e.g. the word "singer" could derive from "single" and "sing"). Furthermore, that these two competing derivations could be composed of a different number of constituents is even rarer, (e.g. the word "crackers" could be broken down into "crack-er-s" and "cracker-s"). Using this heuristic, the analyzer "looks ahead" to determine if an analysis (or path) is promising, and if not, terminates it.

For example, if the analyzer has accessed the entries of one known root, the other possible roots are only considered if they do not require recursive derivation. There other situations where this strategy may be employed to result in high efficiency without loss of lexical coverage.

Figure 2:
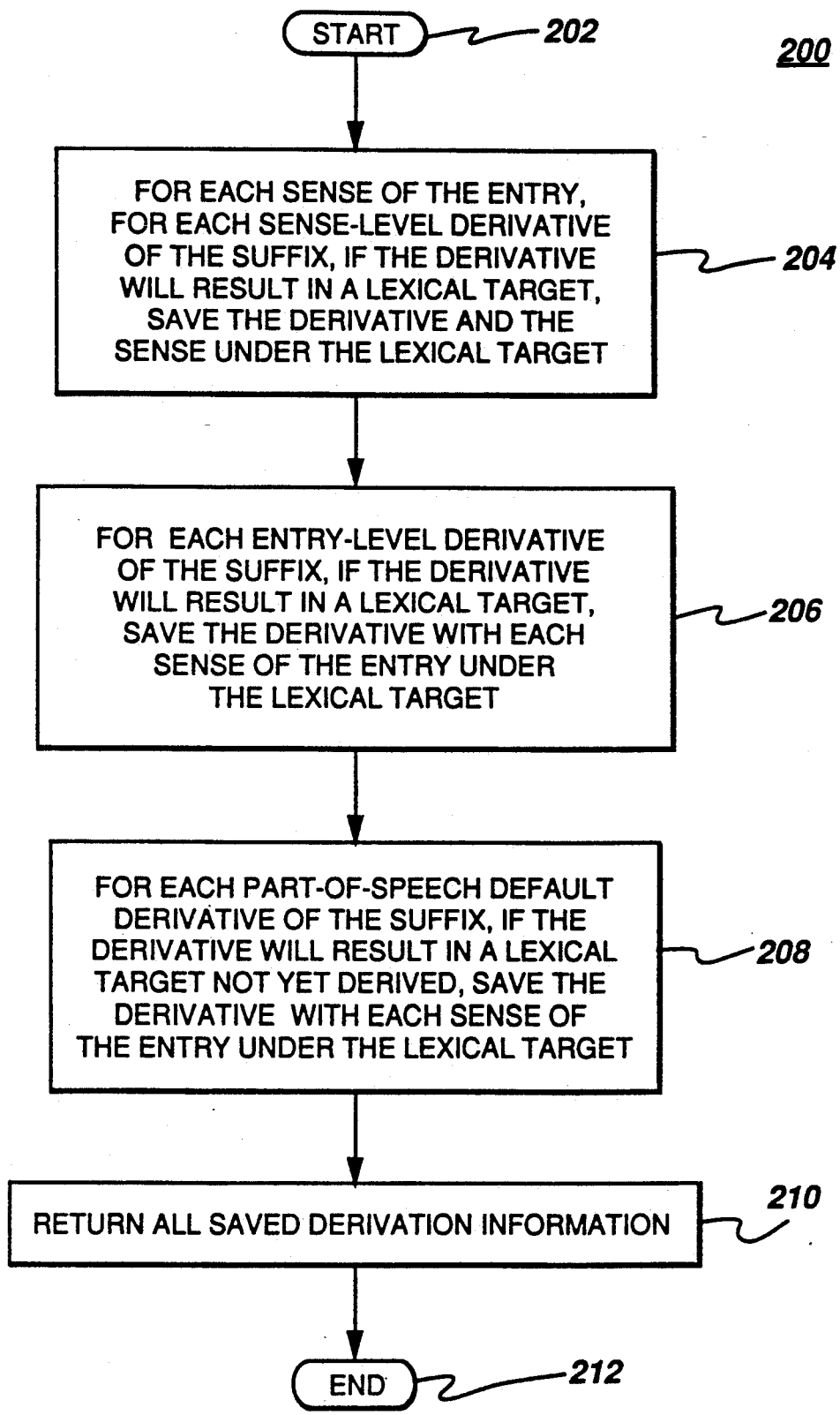
FIG. 2 is a flowchart illustrating a sequence of method steps for retrieving derivation information of an entry for a suffix.
Figure 3:
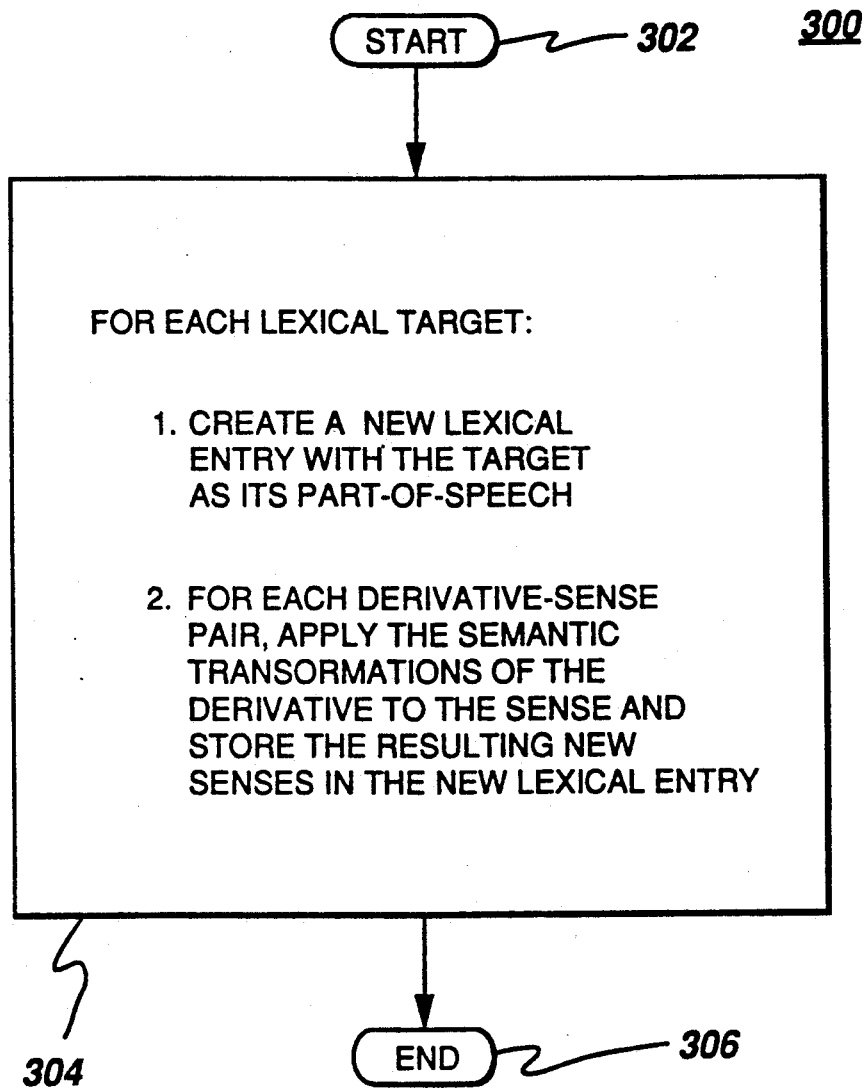
FIG. 3 is a flowchart illustrating a sequence of method steps for applying derivation information to an entry.

Further details with regard to obtaining derivation information are provided in flow charts illustrated in FIGS. 2 and 3. As shown in FIG. 1, subsequent to applying the derivation information to the entry as indicated at step 110, all derived entries are returned as shown at step 112. Operations then end as indicated at a step 114.

Referring now to FIG. 2, a flowchart 200 illustrating a sequence of method steps for retrieving derivation information of an entry for a suffix is shown. Particularly, subsequent to starting operations as indicated at step 202, for each sense of the entry, and for each sense-level derivative of the suffix, if the derivative will result in a lexical target, the derivative and sense are saved under the lexical target as indicated at step 204. Then, as indicated at 206, for each entry-level derivative of the suffix, if the derivative will result in a lexical target, the derivative along with each sense of the entry are saved under the lexical target.

As indicated at step 208, for each part-of-speech default derivative of the suffix, if the derivative will result in a lexicon target not yet derived, the derivative along with each sense of the entry are saved under the lexical target. All saved derivative information is then returned as indicated at step 210. Operations then end as indicated at step 212.

FIG. 3 is a flowchart 300 illustrating a sequence of method steps for applying derivative information to an entry. Particularly, subsequent to starting operations as indicated at a step 302, for each lexical target, the following operations, as shown at 304, are performed: create a new lexical entry with the target as its part-of-speech, and for each derivative sense pair, apply the semantic transformations of the derivative to the sense and store the resulting new senses in the new lexical entry. Operations then end as indicated at step 306.

The analysis of prefixes cause two major complications for the morphological analyzer. First, prefixes add ambiguity to the determination of the root of words. For example, the prefix pre- is also enveloped in normal words such as "prefers", which would cause the analyzer to attempt wasted derivations for invalid roots. Second, since prefixes can be combined with suffixes, there is often ambiguity in which affix is attached first. For example, the word "undoable" has to distinct meanings: "not doable" or "able to be undone". For the analyzer to accurately derive the lexical entries for such words, all orders of attachments must be applied.

Appendix I shows the suffixes and their transformations for each part of speech. For each suffix, the base part of speech (POS) is shown to the left of the arrow and the derived part of speech (or lexical subcategory) is to the right. This part of the table represents the syntactic transformation caused by adding the suffix to a root entry. The list of possible semantic transformation rules follow this syntactic information. The description of each semantic transformation rule is provided in Appendix III.

Appendix II shows the prefixes and their transformations for each part of speech. Prefix derivatives are not encoded in the derivative fields of the lexical entry structure. Rather, these derivatives are treated as global to all members of a lexical category. For example, derivatives involving the prefix un- are assumed for all adjectives, nouns and verbs, and furthermore, the derivative entry is the same for all of them. The handling of prefixes can, of course, be identical to that of suffixes, and their derivative entry structures may be encoded explicitly in the lexical entries.

As mentioned above, Appendix III contains a list of the semantic transformation rules referenced in the derivative entries. Each transform has a description of the transform and an example derivative. If the transform is relevant to only a few affixes, then those affixes are listed in parentheses. The affixes which use these transforms are listed in Appendices I and II.

These rules create the word senses of the derivative, so the user must decide what rules are applicable to the derivative; i.e. what rules will generate the appropriate senses of the derivative. Each derivative must be considered individually, since there are no generally applicable transformations. If the user finds that no rules apply to a given derivative, this derivative should either be encoded as a full lexical entry or as an explicit derivative. If some rules apply, but other senses of the derivative are not encodable as transformations, then these senses should be encoded as explicit derivatives.

Appendix IV contains a computer code listing which may be utilized to control operation of a computer in accordance with the present morphological analysis method. The code is written in Lucid Common Lisp and may be run by a Sun Workstation.

The preferred lexicon to be utilized with the present morphological analysis system and method includes a hierarchy of parent concepts for encoding semantic preferences and restrictions, sense-based morphology and subcategorization, a distinction between primary and secondary senses and senses that require particular "triggers" or appear only in specific contexts, and a broad range of collocational information. For example, the following listing is a lexical entry for the word "issue":

```
(issue
  :POS noun
  :SENSES
  ((issue1
    :EXAMPLE (address important issues)
    :TYPE_p
    :PAR (c-concern)
    :ASSOC (subject)     )
  (issue2
    :EXAMPLE (is that the october issue?)
    :TYPE_s
    :PAR (c-published-document)
    :ASSOC (edition)     )))
(issue
  :POS verb
  :G-DERIV nil
  :SENSES
  ((issue1
    :SYNTAX (one-obj io-rec)
    :EXAMPLE (the stockroom issues supplies)
    :TYPE_p
    :PAR (c-giving)
    :ASSOC (supply)
    :S-DERIV   ((-able adj tr_ability)
                (-ance noun tr_act)
                (-er nour tr_actor))    )
  (issue2
    :SYNTAX (one-obj io-rec)
    :EXAMPLE (I issued instructions)
    :TYPE_p
    :PAR (c-informing)
    :ASSOC (produce)
```

-continued
```
    :S-DERIV ((-ance noun tr_act))    )
  (issue3
    :SYNTAX (one-obj no-obj)
    :EXAMPLE (good smells issue form the cake)
    :Type_s
    :Par (c-passive-moving)    )))
```

The lexicon entry includes only the coarsest distinctions among word senses. Thus, the financial sense of "issue" (e.g., a new security) falls under the same core sense as the latest "issue" of a magazine. This means that for a task like database generation, task-specific processing or inference must augment the core lexical knowledge, but avoids many of the problems with considering many nuances of meaning or low-frequency senses. For example, the "progeny" sense of issue as well as the "exit" sense are omitted from the lexicon. This preserves, in the core lexicon the common coarsest distinctions among senses.

More particularly, each lexical entry has a part of speech :POS and a set of set of core :SENSES. Each core sense has a :TYPE field that indicates "p" for all primary senses and "s" for secondary senses. In general, a semantic interpreter utilizing the present lexicon should not consider secondary senses without specific contextual information. For example, the word "yard" can mean an enclosed area, a workplace, or a unit of measure, but only the enclosed area sense is considered in the zero-context.

The :PAR field links each word sense to its immediate parent in the semantic hierarchy. For example, with the parents and siblings of the two senses of the noun "issue", word senses are given by a root followed by a sense number, with conceptual categories designated by any atom beginning with c-. Explicit derivations are shown by roots followed by endings and additional type specifiers:

| NOUN_ISSUE1: | | | |
|---|---|---|---|
| PARENT CHAIN: | c-concern c-mental-obj c-obj | | |
| | c-entity something | | |
| SIBLINGS: | (all nouns) | regard1 | realm2 |
| puzzle1 | province2 | premonition1 | pity1 |
| pet2 | parameter1 | ground3 | goodwill1 |
| feeling2 | enigma1 | draw2 | department2 |
| concern1 | cause2 | care1 | business3 |
| baby2 | apprehend-ion-x | | |
| NOUN_ISSUE2: | | | |
| parent chain: | c-published-document | | c-document |
| c-phys-obj | c-obj | c-entity | something |
| SIBLINGS: | (all nouns): | week-ly-x | volume1 |
| transcript1 | tragedy2 | tome1 | thesaurus1 |
| supplement2 | strip4 | source2 | software1 |
| serial1 | scripture1 | romance2 | publication |
| profile2 | digest1 | bible1 | paperback1 |
| paper3 | paper2 | pamphlet1 | omnibus1 |
| obituary1 | novel1 | notice2 | month-ly-x |
| memoir1 | map1 | manual1 | magazine1 |
| library1 | journal1 | handbook1 | anthology1 |
| guide1 | grammar1 | gazette1 | dissertation1 |
| feature4 | facsimile1 | epic1 | encyclopedia1 |
| fiction1 | column1 | book1 | period-ic-al-x |
| directory1 | copy2 | atlas1 | dictionary1 |
| comic1 | column2 | blurb1 | catalogue1 |
| calendar1 | bulletin1 | brochure1 | biography1 |
| article1 | bibliography1 | constitute-ion-x1 | |

The basic semantic hierarchy acts as a sense-disambiguated thesaurus, under the assumption that in the absence of more specific knowledge, word senses will tend to share semantic constraints with the most closely related words. Note that derivative lexical entries, such as week-ly-x above, do "double duty" in the lexicon, so that an application program can use the derivation as well as the semantics of the derivative form.

The :ASSOC field includes a lexicographer's choice of synonym or closely related words for each sense.

The :SYNTAX field encodes syntactic constraints and subcategorizations for each sense. Where senses share constraints, these can be encoded at the level of the word entry. When the syntactic constraints, such as io-rec, one-obj, and no-obj, influence semantic preferences, these are attached to the sense entry. For example, in this case "issue" used as an intransitive verb would favor "passive moving" even though it is a secondary sense, while the io-rec subcategorization in the first two senses means that the ditransitive form will fill the recipient conceptual role. The grammatical knowledge base of the system relates these subcategories to semantic roles.

The :G-DERIV and :S-DERIV fields mark morphological derivations. G-DERIV (NIL in this case to indicate no derivations) encodes these derivations at the entry, or word, level, while S-DERIV encodes derivations at the sense level. Each S-DERIV derivation entry can be marked as preferred or unpreferred. For example, the S-DERIV constraint allows "issuance" to derive from either of the first two senses of the verb, with "issuer" and "issuable" deriving only from the "giving" sense.

The derivation triples (such as (-er noun tr_actor)) encode the form of each affix, the resulting syntactic category (usually redundant), and the "semantic transformations" that apply between the core sense and the resulting senses. For example, the "issuer" in this case would play the actor role of sense one of the verb issue. Because derivations often apply to multiple senses and often result in different semantic transformations (for example, the ending -ion can indicate the act of performing some action, the object of the action, or the result of the action), the lexicon often contains strongly "preferred" interpretations to help control the ambiguity.

The lexicon may also include a substantial number of common collocations, such as verb-particle and verb-complement combinations. These expressions are often semantically productive, but the representation of common expressions helps the semantic interpreter to apply preferences. For example, the following is one set of entries for expressions with take:

```
(take
  :POS verb
  :SPECIAL
  ((take50
      :S-COMPOUNDS
        ((vc (or (member c-verb_advise2-obj
                  c-act-of-verb_blame1
                  c-act-of-verb_lose1 noun_profit2)
              c-giving)))
      :EXAMPLE (take delivery)
      :PAR (c-receiving)  )
  (  take 51
      :S-COMPOUNDS ((vc (or (member noun_effort1)
                         c-temporal-obj c-energy)))
      :EXAMPLE (the job takes up time))
      :PAR (c-require-rel)  )
  (  take52
      :S-COMPOUNDS ((vc (or (member noun_office2
                          noun_advantage1 noun_charge1
                          c-act-of-verb_control1 noun_command2
                          noun_responsibility) c-structure-re1
```

```
                          c-shape-re1)))
      :PAR (c-contracting)  )
  (  take 59
      :S-COMPOUNDS ((vc (member noun_effect1)))
      :PAR(c-transpire)  )
  (  take 60
      :S-COMPOUNDS ((vc (or c-task)))
      :PAR (c-deciding)  ))
```

The above entries contain only the verb-complement (vc) relations for "take". Whether these expressions are productive or not, the lexicon can include explicit word sense pairings (such as take 52 with noun _pressure 2), in which case the collocation helps to discriminate the senses of both verb and complement, or a pairing with a conceptual category (such as take 51 with c-temporal-obj), in which case the pairing is more likely to conflict with another but will cover a much broader class of expressions (from take one's time to take years).

While the preferred embodiment has been illustrated and described herein, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

APPENDIX I

© Copyright 1990 General Electric Company

| SUFFIX | POS → POS | SEMANTIC TRANSFORMATION RULES |
|---|---|---|
| ADV suffixes | | |
| -er | adv → comp_adv | tr_more |
| -est | adv → super_adv | tr_most |
| -null | adv → base_adv | tr_no-ch |
| -null | adv → adj | tr_no_ch |
| -ward | adv → adv | tr_direction |
| -ward | adv → adj | tr_direction |
| -wards | adv → adv | tr_direction |
| -wards | adv → adj | tr_direction |
| NUMWORD suffixes | | |
| -ish | numword → adj | tr_num_qual |
| -th | numword → adj | tr_ordinal |
| ADJ suffixes | | |
| -able | adj → adj | tr_ability |
| -al | adj → adj | tr_property |
| -ance | adj → noun | tr_state |
| -ancy | adj → noun | tr_state |
| -ar | adj → adj | tr_property |
| -ary | adj → adj | tr_property |
| -ate | adj → verb | tr_cause |
| -ate | adj → noun | tr_cause |
| -ature | adj → noun | |
| -cy | adj → noun | tr_state tr_office tr_act |
| -dom | adj → noun | tr_state |
| -ee | adj → noun | tr_one-who-is |
| -en | adj → verb | tr_cause tr_become |
| -ency | adj → noun | tr_state |
| -ent | adj → adj | tr_property |
| -er | adj → comp_adj | tr_more |
| -er | adj → noun | tr_one-who-is |
| -ery | adj → noun | tr_state |
| -est | adj → super_adj | tr_most |
| -fy | adj → verb | tr_cause |
| -hood | adj → noun | tr_state |
| -ian | adj → adj | tr_char-of-class |
| -ible | adj → adj | tr_ability |
| -ic | adj → noun | tr_property tr_actor |
| -ician | adj → noun | tr_specialist |
| -ion | adj → noun | tr_entity tr_state |
| -ish | adj → adj | tr_rather |
| -ism | adj → noun | tr_practice tr_state |
| -ist | adj → noun | tr_actor |
| -istic | adj → adj | tr_property |

APPENDIX I-continued
© Copyright 1990 General Electric Company

| SUFFIX | POS → POS | SEMANTIC TRANSFORMATION RULES |
|---|---|---|
| -ity | adj → noun | tr_state tr_entity |
| -ize | adj → verb | tr_cause tr_become |
| -ling | adj → noun | tr_dim tr_one-who-is |
| -ly | adj → adv | tr_manner tr_time tr_order |
| -ly | adj → nummod | tr_num-qual |
| -ly | adj → adj | tr_like tr_property |
| -man | adj → noun | tr_man-assoc-with |
| -minded | adj → adj | tr_has-a-mind-that-is |
| -most | adj → adj | tr_most |
| -ness | adj → noun | tr_state |
| -null | adj → base_adj | tr_no-ch |
| -null | adj → verb | tr_cause tr_become tr_act-as-a |
| -null | adj → adv | tr_no-ch |
| -null | adj → noun | tr_state tr_entity |
| -or | adj → noun | tr_state |
| -ship | adj → noun | tr_state |
| -some | adj → adj | tr_property |
| -ster | adj → noun | tr_actor |
| -th | adj → noun | tr_state |
| -tude | adj → noun | tr_state |
| -ty | adj → noun | tr_state tr_entity |
| -ure | adj → noun | tr_entity |
| -ward | adj → adj | tr_direction |
| -ward | adj → adv | tr_direction |
| -wards | adj → adj | tr_direction |
| -wards | adj → adv | tr_direction |
| -y | adj → adj | tr_property |
| -y | adj → noun | tr_state |
| VERB suffixes | | |
| -able | verb → adj | tr_ability |
| -able | verb → noun | tr_ability-entity |
| -ade | verb → noun | tr_act tr_result tr_actor |
| -age | verb → noun | tr_act tr_result tr_object tr_cost |
| -al | verb → noun | tr_act tr_object |
| -al | verb → adj | tr_property |
| -ance | verb → noun | tr_act tr_state tr_object tr_result |
| -ant | verb → noun | tr_actor |
| -ant | verb → adj | tr_property tr_tend |
| -ard | verb → noun | tr_actor |
| -ary | verb → adj | tr_property |
| -ary | verb → noun | tr_property-entity |
| -asm | verb → noun | tr_result tr_state |
| -ast | verb → noun | tr_actor |
| -ate | verb → verb | tr_cause tr_act |
| -ate | verb → adj | tr_property tr_tend |
| -ator | verb → noun | tr_actor |
| -atory | verb → adj | tr_tend tr_associated |
| -cy | verb → noun | tr_state tr_office tr_act |
| -ed | verb → pt_verb | tr_past |
| -ed | verb → past_part_verb | tr_past |
| -ed | verb → adj | tr_that-was-x-qual |
| -ee | verb → noun | tr_object tr_recipient |
| -eer | verb → noun | tr_actor |
| -en | verb → past_part_verb | tr_past |
| -ent | verb → noun | tr_actor |
| -ent | verb → adj | tr_property tr_tend |
| -er | verb → noun | tr_actor |
| -ery | verb → noun | tr_practice tr_property tr_place tr_state |
| -ess | verb → noun | tr_fem |
| -ful | verb → adj | tr_tend |
| -ible | verb → adj | tr_ability |
| -ible | verb → noun | tr_abilty-entity |
| -ic | verb → adj | tr_property |
| -ic | verb → noun | tr_property-entity |
| -ice | verb → noun | tr_act tr_state tr_object |
| -ier | verb → noun | tr_actor |
| -ing | verb → pres_part_verb | tr_process |
| -ing | verb → noun | tr_act tr_object tr_result tr_material |
| -ing | verb → adj | tr_that-is-x-qual |
| -ion | verb → noun | tr_act tr_state tr_object tr_result |
| -ism | verb → noun | tr_practice tr_state |
| -ist | verb → noun | tr_actor |
| -ite | verb → any | tr_not-general |
| -ity | verb → noun | tr_state tr_entity |
| -ive | verb → adj | tr_tend |
| -ive | verb → noun | tr_actor tr_object |
| -less | verb → adj | tr_inability |
| -man | verb → noun | tr_man-assoc-with |
| -ment | verb → noun | tr_act tr_state tr_object tr_result |
| -null | verb → tl_verb | tr_no-ch |
| -null | verb → fp_sing_pr_verb | tr_present |
| -null | verb → sp_sing_pr_verb | tr_present |
| -null | verb → plur_pr_verb | tr_present |
| -null | verb → noun | tr_act tr_state tr_result tr_object tr_actor tr_state tr_instrument |
| -null | verb → adj | tr_property |
| -null | verb → adv | tr_manner |
| -on | verb → noun | tr_unit |
| -or | verb → noun | tr_actor tr_act tr_state tr_result tr_property |
| -ory | verb → adj | tr_property |
| -ory | verb → noun | tr_place tr_instrument |
| -ous | verb → adj | tr_property |
| -person | verb → noun | tr_actor |
| -red | verb → noun | tr_state |
| -s | verb → tp_sing_pr_verb | tr_present |
| -sis | verb → noun | tr_act tr_result |
| -some | verb → adj | tr_property |
| -ster | verb → noun | tr_actor |
| -ure | verb → noun | tr_act tr_state tr_result tr_object |
| -woman | verb → noun | tr_woman-assoc-with |
| -y | verb → verb | tr_act |
| -y | verb → noun | tr_object tr_act |
| -y | verb → adj | tr_tend |
| NOUN suffixes | | |
| -able | noun → adj | tr_ability tr_given-to |
| -able | noun → noun | tr_ability-entity |
| -ade | noun → noun | tr_liquid |
| -age | noun → noun | tr_collection tr_amount tr_state |
| -al | noun → adj | tr_property |
| -al | noun → noun | tr_property-entity |
| -an | noun → adj | tr_property |
| -an | noun → noun | tr_inhabitant tr_specialist |
| -ant | noun → noun | tr_actor |
| -ant | noun → adj | tr_property tr_tend |
| -ar | noun → adj | tr_property |
| -ar | noun → noun | tr_property-entity |
| -arian | noun → noun | tr_advocate |
| -arian | noun → adj | tr_property |
| -ary | noun → adj | tr_property |
| -ary | noun → noun | tr_property-entity |
| -ate | noun → verb | tr_cause tr_act |
| -ate | noun → adj | tr_property |
| -atory | noun → adj | tr_tend tr_associated |
| -ature | noun → noun | |
| -crat | noun → noun | tr_advocate tr_member |
| -cy | noun → noun | tr_state tr_office tr_act |
| -dom | noun → noun | tr_collection tr_office tr_state |
| -ed | noun → adj | tr_property |
| -ee | noun → noun | tr_dim tr_person-assoc-with |
| -eer | noun → noun | tr_actor |
| -en | noun → verb | tr_cause tr_become |
| -en | noun → adj | tr_made-of |
| -ent | noun → noun | tr_actor |
| -ent | noun → adj | tr_property tr_tend |
| -er | noun → noun | tr_actor tr_producer tr_member tr_inhabitant tr_person-assoc-with |
| -ern | noun → adj | tr_no-ch |
| -ery | noun → noun | tr_practice tr_property tr_place tr_state tr_collection |
| -ese | noun → adj | tr_relating-to-place |
| -ese | noun → noun | tr_inhabitant tr_speech-style |
| -ess | noun → noun | tr_fem |
| -ful | noun → noun | tr_quantity |

APPENDIX I-continued

© Copyright 1990 General Electric Company

| SUFFIX | POS → POS | SEMANTIC TRANSFORMATION RULES |
|---|---|---|
| -ful | noun → adj | tr_property |
| -fy | noun → verb | tr_cause |
| -graphy | noun → noun | tr_science tr_process-of-writing |
| -hood | noun → noun | tr_state tr_rank tr_occupation |
| -ian | noun → adj | tr_char-of-class |
| -ian | noun → noun | tr_char-of-class-entity |
| -ible | noun → adj | tr_ability tr_given-to |
| -ible | noun → noun | tr_ability-entity |
| -ic | noun → adj | tr_property |
| -ical | noun → adj | tr_property |
| -ician | noun → noun | tr_specialist |
| -ier | noun → noun | tr_actor |
| -ine | noun → noun | tr_fem |
| -ing | noun → noun | tr_act tr_object tr_material |
| -ing | noun → adj | tr_property |
| -ish | noun → adj | tr_property |
| -ism | noun → noun | tr_practice tr_state |
| -ist | noun → noun | tr_actor |
| -istic | noun → adj | tr_property |
| -istic | noun → noun | tr_property-entity |
| -ite | noun → any | tr_not-general |
| -ite | noun → noun | tr_member tr_inhabitant |
| -ive | noun → adj | tr_tend tr_property |
| -ize | noun → verb | tr_cause tr_engage-in |
| -less | noun → adj | tr_without |
| -let | noun → noun | tr_dim tr_article-of-clothing |
| -like | noun → adj | tr_like |
| -ling | noun → noun | tr_dim tr_member |
| -logy | noun → noun | tr_literature tr_science |
| -ly | noun → adj | tr_time tr_like tr_property |
| -ly | noun → noun | tr_property-entity |
| -ly | noun → adv | tr_manner tr_property |
| -man | noun → noun | tr-man-assoc-with |
| -men | noun → plur_noun | tr_plural |
| -most | noun → adj | tr_most |
| -most | noun → adj | tr_most |
| -null | noun → sing_noun | tr_singular |
| -null | noun → verb | tr_cause tr_use tr_engage-in tr_become tr_act-as-a |
| -null | noun → adj | tr_property |
| -null | noun → adv | tr_manner tr_direction |
| -or | noun → noun | tr_actor tr_member |
| -ory | noun → noun | tr_place tr_instrument |
| -ory | noun → adj | tr_property |
| -ous | noun → adj | tr_property |
| -person | noun → noun | tr_person-assoc-with |
| -s | noun → plur_noun | tr_plural |
| -ship | noun → noun | tr_occupation tr_skill tr_state tr_collection tr_act |
| -some | noun → adj | tr_property |
| -ster | noun → noun | tr_actor |
| -ure | noun → noun | tr_object tr_rank tr_science tr_collection |
| -ward | noun → adj | tr_direction |
| -ward | noun → adv | tr_direction |
| -wards | noun → adj | tr_direction |
| -wards | noun → adv | tr_direction |
| -woman | noun → noun | tr_woman-assoc-with |
| -women | noun → plur_noun | tr_plural |
| -y | noun → noun | tr_collection tr_place tr_state tr_dim |
| -y | noun → adj | tr_property |

APPENDIX II

© Copyright 1990 General Electric Company

| PREFIX | POS → POS | SEMANTIC TRANSFORMATION RULES |
|---|---|---|
| ADV prefixes | | |
| in- | adv → adv | tr_negative |
| ADJ prefixes | | |
| dis- | adj → adj | tr_negative |
| il- | adj → adj | tr_negative |
| im- | adj → adj | tr_negative |
| in- | adj → adj | tr_negative |
| ir- | adj → adj | tr_negative |
| mis- | adj → adj | tr_negative |
| out- | adj → adj | tr_surpass |
| pre- | adj → adj | tr_before |
| re- | adj → adj | tr_again |
| un- | adj → adj | tr_negative |
| VERB prefixes | | |
| dis- | verb → verb | tr_negative |
| mis- | verb → verb | tr_negative |
| out- | verb → verb | tr_surpass |
| pre- | verb → verb | tr_before |
| re- | verb → verb | tr_again |
| un- | verb → verb | tr_negative |
| NOUN prefixes | | |
| dis- | noun → noun | tr_negative |
| il- | noun → noun | tr_negative |
| im- | noun → noun | tr_negative |
| in- | noun → noun | tr_negative |
| ir- | noun → noun | tr_negative |
| mis- | noun → noun | tr_negative |
| out- | noun → noun | tr_surpass |
| pre- | noun → noun | tr_before |
| re- | noun → noun | tr_again |
| un- | noun → noun | tr_negative |

APPENDIX III

© Copyright 1990 General Electric Company tr_ability "Able to be Xed (-able)" Ex: solvable
tr_act "Act of X" Ex: acquisition
tr_act-as-a "Act as a X does" Ex: to boss
tr_actor "Actor of X" Ex: miner
tr_advocate "Advocate of X (-crat)" Ex: democrat
tr_again "X again (re-)" Ex: redo
tr_amount "Amount of X (-age)" Ex: acreage
tr_article-of-clothing "Article of clothing related to X (-let -wear)" Ex: footwear
tr_associated "Related to X (-story)" Ex: exploratory
tr_become "Become X (-ize -en)" Ex: stabilize
tr_before "Prior to X (pre-)" Ex: predawn
tr_cause "Cause X" Ex: simplify
tr_char-of-class "Characteristic of class X (-ian)" Ex: guardian
tr_collection "Collection, whole, or group of X (-age -ure -dom -ship -y -ery)" Ex: patronage
tr_cost "Cost of service X (-age)" Ex: postage
tr_dim "X has small size (-ee -let -ling -y)" Ex: bootee
tr_direction "Direction toward X (-ward -wards)" Ex: backward
tr_engage-in "Engage in activity or state X (-ize -null)" Ex: to battle
tr_entity "Thing that is X (-istic -able -ure -al -ism -ion -ar -ent -ly -ary -ty -ity -null)" Ex: the affluent
tr_fem "X has feminine gender (-ine -ess)" Ex: actress
tr_given-to "Given to X (-able)" Ex: peaceable
tr_has-a-mind-that-is "Has a mind that is X (-minded)" Ex: narrowminded
tr_inability "Unable to do X (-less)" Ex: ceaseless
tr_inhabitant "Inhabitant of X (-ese -ite)" Ex: chinese
tr_instrument "Instrument of X (-ory)" Ex: accessory
tr_like "Similar to X (-like -ly)" Ex: ladylike
tr_liquid "Liquid made from X (-ade)" Ex: lemonade
tr_literature "Literature concerning X (-logy)" Ex: trilogy
tr_made-of "Made of X (-en)" Ex: wooden
tr_man-assoc-with "Man associated with X (-man)" Ex: mailman
tr_manner "In the manner X (-ly -null)" Ex: quickly
tr_material "Something used in X (-ing)" Ex: flooring
tr_member "Member of group X (-ite -ling -er -or -crat)" Ex: ancestor
tr_more "More of quality X (-er)" Ex: faster
tr_most "Most of quality X (-est)" Ex: fastest
tr_negative "Negative of X (dis- il- im- in- ir- mis- un-)"

APPENDIX III-continued

© Copyright 1990 General Electric Company

Ex: dislike
tr_no-ch "No change to X" Ex:
tr_num-qual "Numeric qualifier (-ly)" Ex: firstly
tr_object "Object of X" Ex: acquisition
tr_occupation "Occupation relating to X (-hood -ship -ess)"
Ex: captainship
tr_office "Office of X (-dom -cy)" Ex: accountancy
tr_one-who-is "One who is X (-ee -ling)" Ex: offeree
tr_order "Having order X (-ly)" Ex: latterly
tr_ordinal "Xth place in a sequence (-th)" Ex: eleventh
tr_past "X happened in the past" Ex: sold
tr_person-assoc-with "Person associated with X (-person)"
Ex: businessperson
tr_place "Place of activity X or thing X (-y -ery -ory)"
Ex: bakery
tr_plural "X has plural number" Ex: dollars
tr_practice "Practice or art of X (-ism -ery)" Ex: carpentry
tr_present "X happened in the present" Ex: sells
tr_process "Ongoing process of X (-ing)" Ex: winning
tr_process-of-writing "Process of writing X (-graphy)"
Ex: stenography
tr_producer "Producer of X" Ex: biographer
tr_property "Quality relating to X" Ex: acidic
tr_quantity "A quantity of X (-ful)" Ex: roomful
tr_rank "Rank of X (-hood -ure)" Ex: sainthood
tr_rather "Rather or somewhat X (-ish)" Ex: yellowish
tr_relating-to-place "Relating to place X (-ese)" Ex: chinese
tr_result "Result of being Xed (too many to list)" Ex: destruction
tr_science "Science of X (-ure -logy -graphy)" Ex: oceanography
tr_singular "X has number singular" Ex: dollar
tr_skill "Skill of X (-ship)" Ex: marksmanship
tr_specialist "Specialist of X (-an -ician)" Ex: beautician
tr_speech-style "Speech style of X (-ese)" Ex: journalese
tr_state "State or condition of X" Ex: organization
tr_surpass "Surpass X (out-)" Ex: outdo
tr_tend "Tending to X (-ate -ive -ful -ant -ent -y -atory)"
Ex: combative
tr_that-is-x-qual "That is Xing (-ing)" Ex: swinging
tr_that-was-x-qual "That was Xed (-ed)" Ex: tired
tr_time "Repeated at interval X (-ly)" Ex: weekly
tr_use "Use X for intended purpose (-null)" Ex: to bank
tr_without "Without X (-less)" Ex: hopeless
tr_woman assoc-with "Woman associated with X (-woman)"
Ex: mailwoman
tr_ability-entity "Thing that is able to X" Ex: a valuable
tr_property-entity "Thing that is has a quality relating to X"
Ex: a criminal
tr_char-of-class-entity "Thing that has the characteristics of class X" Ex: a guardian

APPENDIX IV (c) Copyright 1990 General Electric Company

```
(in-package 'user)
(nl-provide 'nlt-morph)
;;; -*- Syntax: Common-lisp; Base: 10; Package: NLTOOLSET; Mode: LISP -*-
;;;;;;;;;;;;;;;;;;;;;;;;;;;;;;;;;;;;;;;;;;;;;;;;;;;;;;;;;;;;;;;;;;;;;;;;
;;;                                                                  ;;;
;;;     File: morph.lisp                                             ;;;
;;;                                                                  ;;;
;;;                                                                  ;;;
;;;                                                                  ;;;
;;;                                                                  ;;;
;;;     Description: Morphological analyzer functions                ;;;
;;;                                                                  ;;;
;;;                                                                  ;;;
;;;                                                                  ;;;
;;;                                                                  ;;;
;;;;;;;;;;;;;;;;;;;;;;;;;;;;;;;;;;;;;;;;;;;;;;;;;;;;;;;;;;;;;;;;;;;;;;;;

;;;;;;;;;;;;;;;;;;;;;;;;;;;;;;;;;;;;;;;;;;;;;;;;;;;;;;;;;;;;;;;;;;;;;;;;
;;;                                                                  ;;;
;;; Name:   get-s-deriv                                              ;;;
;;;                                                                  ;;;
;;;                                                                  ;;;
;;;                                                                  ;;;
;;;                                                                  ;;;
;;; Args:   entry -- a lexical entry                                 ;;;
;;;         suffix -- a suffix                                       ;;;
;;;         targets -- target linguistic entities                    ;;;
;;;         mode -- mode of access (:full or :quick)                 ;;;
;;;                                                                  ;;;
;;; Description: this function accesses the s-deriv field of the senses  ;;;
;;;              of the entry to locate any transforms for the given ;;;
;;;              suffix. If mode is :quick, t is simply returned if  ;;;
;;;              one sderiv is found.                                ;;;
;;;                                                                  ;;;
;;; Returns: if :full mode, a list of transforms of the form:        ;;;
;;;              ((<newpos> ( <sense> <deriv> + ) + ) ...)           ;;;
;;;                                                                  ;;;
;;;          if :quick mode, t or nil                                ;;;
;;;                                                                  ;;;
;;;;;;;;;;;;;;;;;;;;;;;;;;;;;;;;;;;;;;;;;;;;;;;;;;;;;;;;;;;;;;;;;;;;;;;;

(defun get-s-deriv (entry suffix targets &optional (mode :full) (word nil))
  (do ((sl (lex-senses entry) (cdr sl))
       (s nil)
       (temp nil)
       (res nil))
      ((null sl) res)
    (setf s (car sl))
    (dolist (deriv (sense-s-deriv s))
      (cond ((and (eq suffix (deriv-entity deriv))
```

```
                ;; check to see if deriv will result in a target
                (or (null targets)
                    (member (deriv-newpos deriv) targets))
                ;; in quick mode, don't consider derivations that don't have
                ;; the original word in its irregulars
                (or (eq mode :full)
                    (null word)
                    (null (deriv-irregulars deriv))
                    (not (member word (deriv-irregulars deriv))))
                )
            ;; for quick mode, this is a success
            (if (eq mode :quick)
                (return-from get-s-deriv t))
            (if (setq temp (assoc (deriv-newpos deriv) res))
                (push (list s deriv) (cdr temp))
                (push (list (deriv-newpos deriv) (list s deriv)) res)))
        ))
  ))
```

;;;;;;;;;;;;;;;;;;;;;;;;;;;;;;;;;;;;;;;;;;;;;;;;;;;;;;;;;;;;;;;;;;;;;;;;;;;;;;;
;;;                                                                         ;;;
;;; Name:   get-g-deriv                                                     ;;;
;;;                                                                         ;;;
;;;                                                                         ;;;
;;;                                                                         ;;;
;;;                                                                         ;;;
;;; Args:   entry -- a lexical entry                                        ;;;
;;;         suffix -- a suffix                                              ;;;
;;;         targets -- target linguistic entities                           ;;;
;;;         mode -- mode of access                                          ;;;
;;;                                                                         ;;;
;;; Description: this function access the g-deriv field of the entry        ;;;
;;;              to locate any transforms for the given suffix. If mode     ;;;
;;;              is :quick, t is simply returned if one gderiv is found.    ;;;
;;;                                                                         ;;;
;;; Returns: if :full mode, a list of transforms of the form:               ;;;
;;;              ((<newpos> ( <sense> <deriv> + ) + ) ...)                  ;;;
;;;                                                                         ;;;
;;;          if :quick mode, t or nil                                       ;;;
;;;                                                                         ;;;
;;;;;;;;;;;;;;;;;;;;;;;;;;;;;;;;;;;;;;;;;;;;;;;;;;;;;;;;;;;;;;;;;;;;;;;;;;;;;;;

```
(defun get-g-deriv (entry suffix targets &optional (mode :full) (word nil))
  (let ((res nil) (temp nil))
    (dolist (deriv (lex-g-deriv entry) res)
      (cond ((and (eq suffix (deriv-entity deriv))
                  ;; check to see if deriv will result in a target
                  (or (null targets)
                      (member (deriv-newpos deriv) targets))
                  ;; in quick mode, don't consider derivations that don't have
                  ;; the original word in its irregulars
                  (or (eq mode :full)
                      (null word)
                      (null (deriv-irregulars deriv))
                      (member word (deriv-irregulars deriv)))
                  )
             ;; for quick mode, this is a success
             (if (eq mode :quick)
                 (return-from get-g-deriv t))
             (if (lex-senses entry)
                 (mapc #'(lambda (s)
                           (if (setq temp (assoc (deriv-newpos deriv) res))
                               (push (list s deriv) (cdr temp))
                               (push (list (deriv-newpos deriv) (list s deriv)) res)))
                       (lex-senses entry))
                 ;; if there are no senses, just return the new pos with nil
                 (push (list (deriv-newpos deriv) nil) res)))
            )
      )
    ))
```

;;;;;;;;;;;;;;;;;;;;;;;;;;;;;;;;;;;;;;;;;;;;;;;;;;;;;;;;;;;;;;;;;;;;;;;;;;;;;;;
;;;                                                                         ;;;
;;; Name:   get-default-deriv                                               ;;;
;;;                                                                         ;;;
;;;                                                                         ;;;
;;;                                                                         ;;;
;;;                                                                         ;;;
;;; Args:   entry -- a lexical entry                                        ;;;
;;;         suffix -- a suffix                                              ;;;
;;;         targets -- target linguistic entities                           ;;;
;;;         transforms -- already constructed transforms                    ;;;

```
;;;          mode -- mode of access                                          ;;;
;;;                                                                          ;;;
;;; Description: this function accesses the default deriv for the pos        ;;;
;;;              of the entry to locate any tranforms not explicitly         ;;;
;;;              given in the entry. If mode is :quick, t is returned        ;;;
;;;              if one global deriv is found.                               ;;;
;;;                                                                          ;;;
;;; Returns: if :full mode, a list of transforms of the form:                ;;;
;;;              ((<newpos> ( <sense> <deriv> + ) + ) ...)                   ;;;
;;;                                                                          ;;;
;;;          if :quick mode, to or nil                                       ;;;
;;;                                                                          ;;;
;;;;;;;;;;;;;;;;;;;;;;;;;;;;;;;;;;;;;;;;;;;;;;;;;;;;;;;;;;;;;;;;;;;;;;;;;;;;;;;

(defun get-default-deriv (entry suffix targets transforms &optional (mode :full))
  (let ((temp nil) (res nil) (pos (lex-pos entry)))
    (dolist (deriv (default-derivs-for pos) res)
      (cond ((and (eq (deriv-entity deriv) suffix)
                  ;; check to see if deriv will result in a target
                  (or (null targets)
                      (member (deriv-newpos deriv) targets))
                  ;; no deriv has already been found
                  (not (assoc (deriv-newpos deriv) transforms))
                  ;; no deriv for this default was given in the entry
                  (not (deriv-entry-p entry
                                      suffix
                                      (list (deriv-newpos deriv)))))
             ;; for quick mode, this is a success
             (if (eq mode :quick)
                 (return-from get-default-deriv t))
             (if (lex-senses entry)
                 (mapc #'(lambda (s)
                           (if (setq temp (assoc (deriv-newpos deriv) res))
                               (push (list s deriv) (cdr temp))
                               (push (list (deriv-newpos deriv) (list s deriv)) res)))
                       (lex-senses entry))
                 ;; if there are no senses, just return the new pos
                 (push (list (deriv-newpos deriv) nil) res)))
      )
    )
  ))

;;;;;;;;;;;;;;;;;;;;;;;;;;;;;;;;;;;;;;;;;;;;;;;;;;;;;;;;;;;;;;;;;;;;;;;;;;;;;;;
;;;                                                                          ;;;
;;; Name: valid-transforms-for                                               ;;;
;;;                                                                          ;;;
;;;                                                                          ;;;
;;;                                                                          ;;;
;;;                                                                          ;;;
;;; Args: entry -- a lexical entry                                           ;;;
;;;       suffix -- a suffix                                                 ;;;
;;;       targets -- target linguistic entities                              ;;;
;;;                                                                          ;;;
;;; Description: this function retrieves the transforms from the             ;;;
;;;              s-deriv and g-deriv fields, and the default transforms      ;;;
;;;              from the entry's part of speech                             ;;;
;;;                                                                          ;;;
;;; Returns: a list of transforms of the form:                               ;;;
;;;              ((<newpos> ( <sense> <deriv> + ) + ) ...)                   ;;;
;;;                                                                          ;;;
;;; Example:                                                                 ;;;
;;;                                                                          ;;;
;;;;;;;;;;;;;;;;;;;;;;;;;;;;;;;;;;;;;;;;;;;;;;;;;;;;;;;;;;;;;;;;;;;;;;;;;;;;;;;

(defun valid-transforms-for (entry suffix targets)
  (let ((res nil))
    (setf res (append (get-s-deriv entry suffix targets)
                      (get-g-deriv entry suffix targets)))
    (setf res (append res
                      (get-default-deriv entry suffix targets res)))
    (if (null res)
        (mdebug 'valid-transforms
                "Valid-transforms-for returning NIL-%")
        (mdebug 'valid-transforms
                "Valid-transforms-for returning -%-(-10T-s-%-)-%"
                (mapcar #'(lambda (r)
                            (list (car r)
                                  (if (null (cadr r))
                                      nil
                                      (mapcar #'(lambda (p)
                                                  (list (sense-name (car p))
```

```
                                        (deriv-rules (cadr p))))
                              (cdr r)))))
                   res)))
    res))

;;;;;;;;;;;;;;;;;;;;;;;;;;;;;;;;;;;;;;;;;;;;;;;;;;;;;;;;;;;;;;;;;;;;;;;;
;;;                                                                  ;;;
;;; Name: guess-transforms-for                                       ;;;
;;;                                                                  ;;;
;;;                                                                  ;;;
;;;                                                                  ;;;
;;;                                                                  ;;;
;;; Args: entry -- a lexical entry                                   ;;;
;;;       suffix -- a suffix                                         ;;;
;;;       targets -- target linguistic entities                      ;;;
;;;                                                                  ;;;
;;; Description: this function guesses the suffix's transforms for the ;;;
;;;              entry using first the preferred interpretations and ;;;
;;;              then all interpretations.                           ;;;
;;;                                                                  ;;;
;;; Returns: a list of transforms of the form:                       ;;;
;;;              ((<newpos> ( <sense> <deriv> + ) + ) ...)           ;;;
;;;                                                                  ;;;
;;;;;;;;;;;;;;;;;;;;;;;;;;;;;;;;;;;;;;;;;;;;;;;;;;;;;;;;;;;;;;;;;;;;;;;;

(defun guess-transforms-for (entry suffix targets)
  (let ((res nil) (temp nil) (pos (lex-pos entry)))
    (or
     ;; first try the preferred derivs for the base pos
     (dolist (deriv (preferred-derivs-for pos) res)
       (if (and (eq (deriv-entity deriv) suffix)
                ;; check to see if deriv will result in a target
                (or (null targets)
                    (member (deriv-newpos deriv) targets)))
           (if (lex-senses entry)
               (mapc #'(lambda (s)
                         (if (setq temp (assoc (deriv-newpos deriv) res))
                             (push (list s deriv) (cdr temp))
                             (push (list (deriv-newpos deriv) (list s deriv)) res)))
                     (lex-senses entry))
               ;; if there are no senses, just return the new pos
               (push (list (deriv-newpos deriv) nil) res)))
       )
     ;; and if that fails, try anything
     (dolist (transform (transforms-for suffix) res)
       (if (and (eq pos (transform-base-pos transform))
                (not (eq (transform-new-pos transform) 'any))
                ;; check to see if deriv will result in a target
                (or (null targets)
                    (member (transform-new-pos transform) targets)))
           (if (lex-senses entry)
               (mapc #'(lambda (s)
                         (if (setq temp (assoc (transform-new-pos transform) res))
                             (push (list s (make-deriv :rules (transform-sem-rules transform)))
                                   (cdr temp))
                             (push (list (transform-new-pos transform)
                                         (list s (make-deriv :rules (transform-sem-rules transform))))
                                   res)))
                     (lex-senses entry))
               ;; if there are no senses, just return the new pos
               (push (list (transform-new-pos transform) nil) res)))
       )
     )
    (if (null res)
        (mdebug 'guess-transforms
                "Guess-transforms-for returning NIL-%")
        (mdebug 'guess-transforms
                "Guess-transforms-for returning -%{-10T-s-%-}-%"
                (mapcar #'(lambda (r)
                            (list (car r)
                                  (if (null (cadr r))
                                      nil
                                      (mapcar #'(lambda (p)
                                                  (list (sense-name (car p))
                                                        (deriv-rules (cadr p))))
                                              (cdr r)))))
                        res)))
    res))
```

```
;;;;;;;;;;;;;;;;;;;;;;;;;;;;;;;;;;;;;;;;;;;;;;;;;;;;;;;;;;;;;;;;;;;;;;;;;;;;;
;;;                                                                       ;;;
;;; Name:  prefix-transforms-for                                          ;;;
;;;                                                                       ;;;
;;;                                                                       ;;;
;;;                                                                       ;;;
;;;                                                                       ;;;
;;; Args:  entry -- a lexical entry structure                             ;;;
;;;        prefix -- a prefix                                             ;;;
;;;                                                                       ;;;
;;; Description: this function uses general knowledge of the prefix to    ;;;
;;;              produce the transform. This process is different than    ;;;
;;;              for a suffix, since prefix derivations are not attached  ;;;
;;;              to entries and the specific syntactic category of the    ;;;
;;;              entry is preferred the general knowledge.                ;;;
;;;                                                                       ;;;
;;; Returns: a list of one transform of the same for as                   ;;;
;;;          valid-transforms-for                                         ;;;
;;;                                                                       ;;;
;;;;;;;;;;;;;;;;;;;;;;;;;;;;;;;;;;;;;;;;;;;;;;;;;;;;;;;;;;;;;;;;;;;;;;;;;;;;;

(defun prefix-transforms-for (entry prefix)
  (do ((tl (transforms-for prefix) (cdr tl))
       (newpos nil)
       (res nil))
      ((or res (null tl))
       (mdebug 'prefix-transforms
               "Prefix-transforms-for returning -%-(-10T-s-%-)-%"
               (mapcar #'(lambda (r)
                           (list (car r)
                                 (if (null (cadr r))
                                     nil
                                     (mapcar #'(lambda (p)
                                                 (list (sense-name (car p))
                                                       (deriv-rules (cadr p))))
                                             (cdr r)))))
                       res))
       res)
    (cond
     ;; use isa here since the lex-pos is a specific entity
     ;; and the base-pos is general
     ((isa (lex-pos entry) (transform-base-pos (car tl)))
      ;; if the lex-pos is more specific than the new pos
      ;; use the lex-pos, other use the transform's
      (if (isa (lex-pos entry) (transform-new-pos (car tl)))
          (setf newpos (lex-pos entry))
          (setf newpos (transform-new-pos (car tl))))

(if (lex-senses entry)
          (push (cons newpos
                      (mapcar #'(lambda (s)
                                  (list s
                                        (make-deriv :rules (transform-sem-rules (car tl)))
                                        ))
                              (lex-senses entry)))
                res)
          ;; if no senses, use a nil sense-deriv pair
          (push (list newpos nil) res))

))
    ))

(defun allrules (semtranspairs)
  (delete-duplicates
   (reduce #'append
           (mapcar #'deriv-rules
                   (reduce #'append
                           (mapcar #'cdr semtranspairs))))))

;;;;;;;;;;;;;;;;;;;;;;;;;;;;;;;;;;;;;;;;;;;;;;;;;;;;;;;;;;;;;;;;;;;;;;;;;;;;;
;;;
;;; Name: apply-transforms
;;;
;;;
;;;
;;;
;;; Args: word -- a word
;;;       entry -- a lexical entry for the word
;;;       entity -- a suffix or a prefix
;;;       &key
;;;       transforms -- given transforms
;;;       targets -- target linguistic entities
```

```
;;;         mode -- mode of accessing transforms
;;;         level -- level of recursion
;;;
;;; Description: this function is the driver program for applying
;;;              a suffix's syntactic and semantic transforms on a base
;;;              entry. In :normal mode, only valid transforms explicitly
;;;              in the entry will be accessed. In :irregular mode,
;;;              only the given transforms will be used. In :guess mode,
;;;              general part of speech and suffix knowledge will be
;;;              accessed to determine the suffix's transforms. In
;;;              :prefix mode, a special access of default prefix
;;;              derivation info is performed.
;;;              Having successfully accessed transforms, this function
;;;              applies each one's syntactic and semantic transforms
;;;              to create a new lexical entry structure. Only those
;;;              transforms that result in a target linguistic entity
;;;              will be accessed. At the end, any x-derivs are added
;;;              to the results.
;;;
;;; Returns: a list of lexical entries
;;;
;;;;;;;;;;;;;;;;;;;;;;;;;;;;;;;;;;;;;;;;;;;;;;;;;;;;;;;;;;;;;;;;;;;;;;;;;;

(defun apply-transforms (word entry entity &key
                              (transforms nil) (targets nil)
                              (mode :normal) (level 0))
  (if (not (lex-p entry))
      (nl-error :lexicon :break
                "Bad entry -s in apply-transforms for -s-%"
                entry word))
  (let ((n (* 3 level))
        (ename (lex-name entry)))

;; access the transforms
    (setf transforms
          (case mode
            (:normal (valid-transforms-for entry entity targets))
            (:irregular transforms)
            (:prefix (prefix-transforms-for entry entity))
            (:guess (guess-transforms-for entry entity targets))
            (otherwise nil)))

(if (null transforms)
        (mdebug 'transforms
                "-vTNo -s transforms for -s to apply on -s-%"
                n mode entity ename))

;; for each transform
    (do ((tl transforms (cdr tl))
         (newtype nil) (semtranspairs nil)
         (newent nil)
         (newsenses nil nil)
         (res nil))
        ((null tl)
         (if (eq mode :normal)
             (setf res (add-x-deriv entry entity res level targets)))
         res)

(setf newtype (caar tl) semtranspairs (cdar tl))
      (mdebug 'transforms "-vTApplying -s transform -s -s on -s ..."
              n
              mode
              newtype
              (if (null (car semtranspairs))
                  '(*NO-SENSES*)
                (allrules semtranspairs))
              ename)
      (cond
       ;; this may never execute
       ((null (setq newent (apply-syn-transform ename newtype entity)))
        (mdebug 'transforms " failed due to syntax-%"))
       ;; a null semantic transform pair means their are no senses of
       ;;   the entry to transform
       ((and (car semtranspairs)
             (not (eq (lex-deriv-mode) :syntax-only))
             (null (setq newsenses (apply-all-sem-transforms semtranspairs))))
        (mdebug 'transforms " failed due to semantics-%"))
       (t
        (mdebug 'transforms
                "-%-vT  resulting in new entity -s with senses -s-%"
                n newent (or newsenses '(*NO-SENSES*)))
```

```
        ;; increment the total deriv cost
        (incf *total-deriv-cost* (deriv-cost mode))

;; in first sense mode, just keep the first derived sense
        (if (eq (lex-deriv-mode) :first-sense)
            (setf newsenses (list (car newsenses))))

;; construct the new entity
        (setf newent
              (make-lex :name newent
                        :pos newtype
                        :senses newsenses
                        :cost (+ (lex-cost entry)
                                 (deriv-cost mode))
                        :trail (cons (list word (lex-pos entry) entity mode)
                                     (lex-trail entry))
                        ))

;; set the properties of the new entry
        (setf (lex-props newent)
              (props-for-lex entry newent))

;; make sure syntactic features of senses agree with new type
        (setf (lex-senses newent)
              (apply-syntactic-features newent))

;; set the sense bkptrs
        (mapc #'(lambda (x) (setf (sense-bkptr x) newent)) (lex-senses newent))

;; add new entity to result
        (push newent res)))
    )
 ))

;;;;;;;;;;;;;;;;;;;;;;;;;;;;;;;;;;;;;;;;;;;;;;;;;;;;;;;;;;;;;;;;;;;;;;;;;;;;
;;;
;;; Name:   apply-syntactic-features
;;;
;;;
;;;            . -
;;;
;;; Args:   entry -- a newly created lexical entry
;;;
;;; Description: check if the senses of the entry obey the syntactic
;;;              properties of the entry.
;;;
;;; Returns: only those senses that obey
;;;
;;; Example: noun_sale
;;;
;;;;;;;;;;;;;;;;;;;;;;;;;;;;;;;;;;;;;;;;;;;;;;;;;;;;;;;;;;;;;;;;;;;;;;;;;;;;

(defun apply-syntactic-features (entry)
  (let ((props (getl (lex-pos entry) '*s-l*))
        (res nil))
    (dolist (s (lex-senses entry))
      (do ((fl (sense-syntax s) (cdr fl))
           (val nil)
           (flag nil))
          ((or (null fl) flag)
           (if (not flag)
               (push s res)
               (nl-error :lexicon :special
                         "Eliminating ~s of ~s due to syntax ~s~%"
                         (sense-name s) (lex-name entry) (sense-syntax s))))
        (if (and (not (atom (car fl)))
                 (not (eq (caar fl) 'wh-ness))
                 (setf val (assoc (caar fl) props))
                 (not (eq (cadr val) (cadar fl))))
            (setf flag t)))
      )
    (reverse res)))

;;;;;;;;;;;;;;;;;;;;;;;;;;;;;;;;;;;;;;;;;;;;;;;;;;;;;;;;;;;;;;;;;;;;;;;;;;;;    ;;;
;;;                                                                            ;;;
;;; Name:   props-for-lex                                                      ;;;
;;;                                                                            ;;;
;;;                                                                            ;;;
;;;                                                                            ;;;
;;;                                                                            ;;;
;;; Args:   entry -- base entry                                                ;;;
;;;         newent -- new derived entry                                        ;;;
```

```
;;;
;;; Description:  construct the property list of the new entry, including    ;;;
;;;               the root.                                                   ;;;
;;;                                                                            ;;;
;;; Returns:  a property list                                                 ;;;
;;;;;;;;;;;;;;;;;;;;;;;;;;;;;;;;;;;;;;;;;;;;;;;;;;;;;;;;;;;;;;;;;;;;;;;;;;;;;;

(defun props-for-lex (entry newent)
  (let* ((newtype (lex-pos newent))
         (rprop (list (unpseudo 'root newtype)
                      (concat (car (isa-member newtype (lexical-categories)))
                              ,
                              (immediate-root-of newent)))))

(cons rprop
          ;; this is to keep the properties of adv_how
          (if (and (not (eq (lex-pos entry) newtype))
                   (isa newtype (lex-pos entry)))
              (remove-if #'(lambda (x)
                             (eq (car x) (unpseudo 'root (lex-pos entry))))
                         (lex-props entry))
              nil))
    ))

;;;;;;;;;;;;;;;;;;;;;;;;;;;;;;;;;;;;;;;;;;;;;;;;;;;;;;;;;;;;;;;;;;;;;;;;;;;;;;
;;;                                                                            ;;;
;;; Name:  add-x-deriv                                                        ;;;
;;;                                                                            ;;;
;;;                                                                            ;;;
;;;                                                                            ;;;
;;;                                                                            ;;;
;;; Args:  entry -- a lexical entry                                           ;;;
;;;        suffix -- a suffix                                                 ;;;
;;;        priorresults -- prior results from applying transforms             ;;;
;;;        level -- level of recursion                                        ;;;
;;;        targets -- target linguistic entities                              ;;;
;;;                                                                            ;;;
;;; Description:  this function adds in the x-derivs to the prior             ;;;
;;;               results                                                     ;;;
;;;                                                                            ;;;
;;; Returns:  the possibly modified prior results                             ;;;
;;;                                                                            ;;;
;;;;;;;;;;;;;;;;;;;;;;;;;;;;;;;;;;;;;;;;;;;;;;;;;;;;;;;;;;;;;;;;;;;;;;;;;;;;;;

(defun add-x-deriv (entry suffix priorresults level targets &aux (temp nil))
  (dolist (xdrv (lex-x-deriv entry) priorresults)
    (if (and (eq suffix (deriv-entity xdrv))
             (or (null targets)
                 (member (deriv-newpos xdrv) targets)))
        (cond
          ((setq temp (car (member (deriv-newpos xdrv) priorresults
                                   :test #'(lambda (x y) (eq x (lex-pos y))))))
           (mdebug 'lex-access "-vTAdding x-deriv -s to senses of -s-%"
                   (* 3 level) (mapcar #'sense-name (deriv-rules xdrv)) (lex-name temp))
           ;; this append is okay since temp is a dynamic structure
           (setf (lex-senses temp)
                 (append (lex-senses temp) (deriv-rules xdrv)))
           )

(t
           (setf temp (make-x-deriv (concat (remove-first (lex-name entry)) suffix)
                                    xdrv))
           (mdebug 'lex-access "-vTUsing xderivs -s to create entry -s-%"
                   (* 3 level) (mapcar #'sense-name (deriv-rules xdrv)) (lex-name temp))
           (push temp priorresults)
           )
          )
        )
    ))

;;;;;;;;;;;;;;;;;;;;;;;;;;;;;;;;;;;;;;;;;;;;;;;;;;;;;;;;;;;;;;;;;;;;;;;;;;;;;;
;;;                                                                            ;;;
;;; Name:  deriv-cost                                                         ;;;
;;;                                                                            ;;;
;;;                                                                            ;;;
;;;                                                                            ;;;
;;;                                                                            ;;;
;;; Args:  mode -- mode of accessing transforms                               ;;;
;;;                                                                            ;;;
```

```
;;; Description: this function determines the cost of performing        ;;;
;;;              a derivation -- which right now is only dependent on    ;;;
;;;              the mode.                                               ;;;
;;;                                                                       ;;;
;;; Returns: a cost                                                      ;;;
;;;;;;;;;;;;;;;;;;;;;;;;;;;;;;;;;;;;;;;;;;;;;;;;;;;;;;;;;;;;;;;;;;;;;;;;;;;

(defun deriv-cost (mode)
  (if (eq mode :guess)
      15
      5))

;;;;;;;;;;;;;;;;;;;;;;;;;;;;;;;;;;;;;;;;;;;;;;;;;;;;;;;;;;;;;;;;;;;;;;;;;;;
;;;
;;; Name:  apply-syn-transform
;;;
;;;
;;;
;;;
;;; Args:  ename -- a lexical entry name
;;;        newtype -- the new linguistic type to create
;;;        entity -- the entity which invoked this new type
;;;
;;; Description: this function creates the name of a derived entry
;;;              by replacing the old type of ename with newtype and
;;;              appending the entity
;;;
;;; Returns: a name
;;;
;;;;;;;;;;;;;;;;;;;;;;;;;;;;;;;;;;;;;;;;;;;;;;;;;;;;;;;;;;;;;;;;;;;;;;;;;;;

(defun apply-syn-transform (ename newtype entity)
  (if (suffix-of entity)
      (concat newtype '_ (car (break-name ename)) entity)
      (concat newtype '_ entity (car (break-name ename)))))

;;;;;;;;;;;;;;;;;;;;;;;;;;;;;;;;;;;;;;;;;;;;;;;;;;;;;;;;;;;;;;;;;;;;;;;;;;;
;;;                                                                     ;;;
;;; Name:  apply-all-sem-transforms                                     ;;;
;;;                                                                     ;;;
;;;                                                                     ;;;
;;;                                                                     ;;;
;;;                                                                     ;;;
;;; Args:  all-sem-trans -- a list of (sense deriv) pairs               ;;;
;;;                                                                     ;;;
;;; Description: this function applies all the semantic transforms      ;;;
;;;              associated with each sense. Also, at this time         ;;;
;;;              isa-transforms are replaced with conceptual categories.;;;
;;;                                                                     ;;;
;;; Returns: list of sense structures                                   ;;;
;;;                                                                     ;;;
;;;;;;;;;;;;;;;;;;;;;;;;;;;;;;;;;;;;;;;;;;;;;;;;;;;;;;;;;;;;;;;;;;;;;;;;;;;

(defun apply-all-sem-transforms (all-sem-trans)
  (let ((res nil) (newsem nil) (basesense nil) (deriv nil))

;; for each sense deriv pair
    (dolist (sense-deriv all-sem-trans res)
      (setf basesense (car sense-deriv) deriv (cadr sense-deriv))
      (if (setf newsem (apply-sem-transforms basesense deriv))
          (setf res (append res newsem)))
      )
    ))

;;;;;;;;;;;;;;;;;;;;;;;;;;;;;;;;;;;;;;;;;;;;;;;;;;;;;;;;;;;;;;;;;;;;;;;;;;;
;;;                                                                     ;;;
;;; Name:  apply-sem-transforms                                         ;;;
;;;                                                                     ;;;
;;;                                                                     ;;;
;;;                                                                     ;;;
;;;                                                                     ;;;
;;; Args:  sense -- a word sense structure                              ;;;
;;;        deriv -- derivation entry structures                         ;;;
;;;                                                                     ;;;
;;; Description: this function applies all the semantic transforms of   ;;;
;;;              the deriv structure to the word sense                  ;;;
;;;                                                                     ;;;
;;; Returns: list of new word sense structures                          ;;;
;;;                                                                     ;;;
;;;;;;;;;;;;;;;;;;;;;;;;;;;;;;;;;;;;;;;;;;;;;;;;;;;;;;;;;;;;;;;;;;;;;;;;;;;
```

```
(defun apply-sem-transforms (sense deriv)
  (declare (ftype (function (t) t) add-morph-pref add-default-syntax))
  (let ((res nil) (temp nil))
    ;; initialize the sense derivation trail
    (if (null (sense-trail sense))
      (setf (sense-trail sense)
            (list (list '*base* (sense-name sense)))))

(dolist (rule (deriv-rules deriv))
      (if (setq temp (apply rule (list sense)))
          (setf res (append res (list temp)))))

(mapc #'(lambda (x)
              ;; add in the derivation preference
              (add-morph-pref x (deriv-pref deriv))
              ;; add default syntax if its a new pos
              (if (not (isa (deriv-newpos deriv) (deriv-base deriv)))
                  (add-default-syntax (deriv-newpos deriv) x)
                (if (null (sense-syntax x))
                    (setf (sense-syntax x) (sense-syntax sense))))
              ;; add in the derivs subentries as s-derivs
              (setf (sense-s-deriv x) (deriv-subentries deriv)))
          res)
    res))
```

What is claimed is:

1. A computer based method for performing morphological analysis of word structure comprising the steps of:
   breaking a word into possible base-affix pairs;
   modifying the base of each base-affix pair into possible roots;
   retrieving each lexical entry of each root in a lexicon;
   deriving a lexical entry for a root if a lexical entry is not provided in the lexicon;
   retrieving derivation information for each affix from its lexical entry;
   creating a new lexical entry with a target as its part-of-speech for each lexical target; and
   generating semantic transformations of the derivation information for a sense and storing the result in the lexical entry.

2. A method of operating a computer for performing morphological analysis of word structure comprising the steps of:
   breaking a word into possible base-affix pairs;
   modifying the base of each base-affix pair into possible roots;
   retrieving each lexical entry of each root in a lexicon;
   deriving a lexical entry for a root if a lexical entry is not provided in the lexicon;
   retrieving derivation information for each affix from its lexical entry;
   creating a new lexical entry with a target as its part-of-speech for each lexical target; and
   generating semantic transformations of the derivation information for a sense and storing the result in the lexical entry.

3. A computer based method for performing morphological analysis of word structure comprising the steps of:
   breaking a word into possible base-affix pairs;
   modifying the base of each base-affix pair into possible roots;
   retrieving each lexical entry of each root in a lexicon;
   deriving a lexical entry for a root if a lexical entry is not provided in the lexicon;
   storing a derivative and a sense under a lexical target for each sense of the entry and for each sense level derivative of a suffix wherein, said derivative results in said lexical target;
   storing a derivative with each sense of the entry under a lexical target for each entry-level derivative of a suffix, wherein said derivative results in said lexical target;
   storing a derivative with each sense of the entry under a lexical target for each part-of-speech default derivative of a suffix, wherein said derivative results in a lexical target not yet derived; and
   applying the derivation information to the entry.

4. A method in accordance with claim 3 wherein applying derivation information to an entry comprises the steps of:
   creating a new lexical entry with a target as its part-of-speech for each lexical target; and
   applying the semantic transformations of the derivative to the sense and storing the resulting new senses in the new lexical entry for each lexical target.

5. A method in accordance with claim 3 wherein the affix is a prefix.

6. A method in accordance with claim 3 wherein the affix is a suffix.

7. A method of operating a computer for performing morphological analysis of word structure comprising the steps of:
   breaking a word into possible base-affix pairs;
   modifying the base of each base-affix pair into possible roots;
   retrieving each lexical entry of each root in a lexicon;
   deriving a lexical entry for a root if a lexical entry is not provided in the lexicon;
   storing a derivative and a sense under a lexical target for each sense of the entry and for each sense level derivative of a suffix wherein, said derivative results in said lexical target;
   storing a derivative with each sense of the entry under a lexical target for each entry-level derivative of a suffix, wherein said derivative results in said lexical target;
   storing a derivative with each sense of the entry under a lexical target for each part-of-speech default derivative of a suffix, wherein said derivative results in a lexical target not yet derived; and
   applying the derivation information to the entry.

8. A method in accordance with claim 7 wherein applying derivation information to an entry comprises the steps of:

creating a new lexical entry with a target as its part-of-speech for each lexical target; and applying the semantic transformations of the derivative to the sense and storing the resulting new senses in the new lexical entry for each lexical target.

9. A method in accordance with claim 7 wherein the affix is a prefix.

10. A method in accordance with claim 7 wherein the affix is a suffix.

* * * * *